Oct. 13, 1925.

C. P. BENNING

MOTOR CAR

Filed Feb. 24, 1925

Inventor:
Clyde P. Benning

Oct. 13, 1925.

C. P. BENNING

MOTOR CAR 1,556,900

Filed Feb. 24, 1925     2 Sheets-Sheet 2

Inventor:
Clyde P. Benning,

Patented Oct. 13, 1925.

1,556,900

UNITED STATES PATENT OFFICE.

CLYDE P. BENNING, OF OAK PARK, ILLINOIS, ASSIGNOR TO MUDGE & COMPANY, OF CHICAGO, ILLINOIS, A CORPORATION OF ILLINOIS.

MOTOR CAR.

Application filed February 24, 1925. Serial No. 11,004.

*To all whom it may concern:*

Be it known that I, CLYDE P. BENNING, a citizen of the United States, residing at Oak Park, in the county of Cook and State of Illinois, have invented certain new and useful Improvements in Motor Cars, of which the following is a specification, reference being had to the accompanying drawings, and to the reference characters marked thereon, which form a part of this specification.

This invention relates to motor cars for track inspection on railways, of the type illustrated in the Vanatta Letters Patent No. 1,456,659, dated March 29, 1923, and more specifically, to improved means whereby the car may be more easily handled when being placed upon or removed from the railway tracks by an operator.

The general construction and design of the heavy cars of this type is such as to make it awkward for one person to handle the car. It has been proposed, as shown in said Vanatta patent, to obviate the theretofore existing difficulties, by means of a pair of handle bars slidably attached to the sides of the somewhat narrow, raised seat frame structure, so that said bars could be extended longitudinally of the seat frame a sufficient distance to enable the operator to lift one end of the car by said handle bars and swing the wheels of the lifted end over the track. In the structure of the said Vanatta patent, the space between the handle bars has been limited by the width of the frame suppoprting the raised seat, making it difficult if not impossible for the operator to stand between the extended handles to secure a better hold thereon.

The object of the present invention is to provide cars of this class with extension arms and handles, which after being first drawn forwardly in extension of their normal position on the seat frame, may then be spread apart laterally at their handle ends, thus affording a better leverage for the operator.

The advantages of my invention will be apparent as I proceed with the specification. To the accomplishment of these objects and advantages, the invention consists in the device herein illustrated, described and pointed out in the appended claims.

In the accompanying drawings:

Fig. 5 is a plan view, enlarged, of a portion of one handle bar and its adjacent supporting side frame member.

Fig. 6 is a longitudinal, sectional view through the part shown in Fig. 5, the section being taken in the vertical plane indicated by the dotted line 6—6 of Fig. 5.

Fig. 7 is a transverse, sectional view, enlarged, of the part shown in Fig. 5, the section being taken in the vertical plane indicated by the dotted line 7—7 of Fig. 5.

Figure 1:
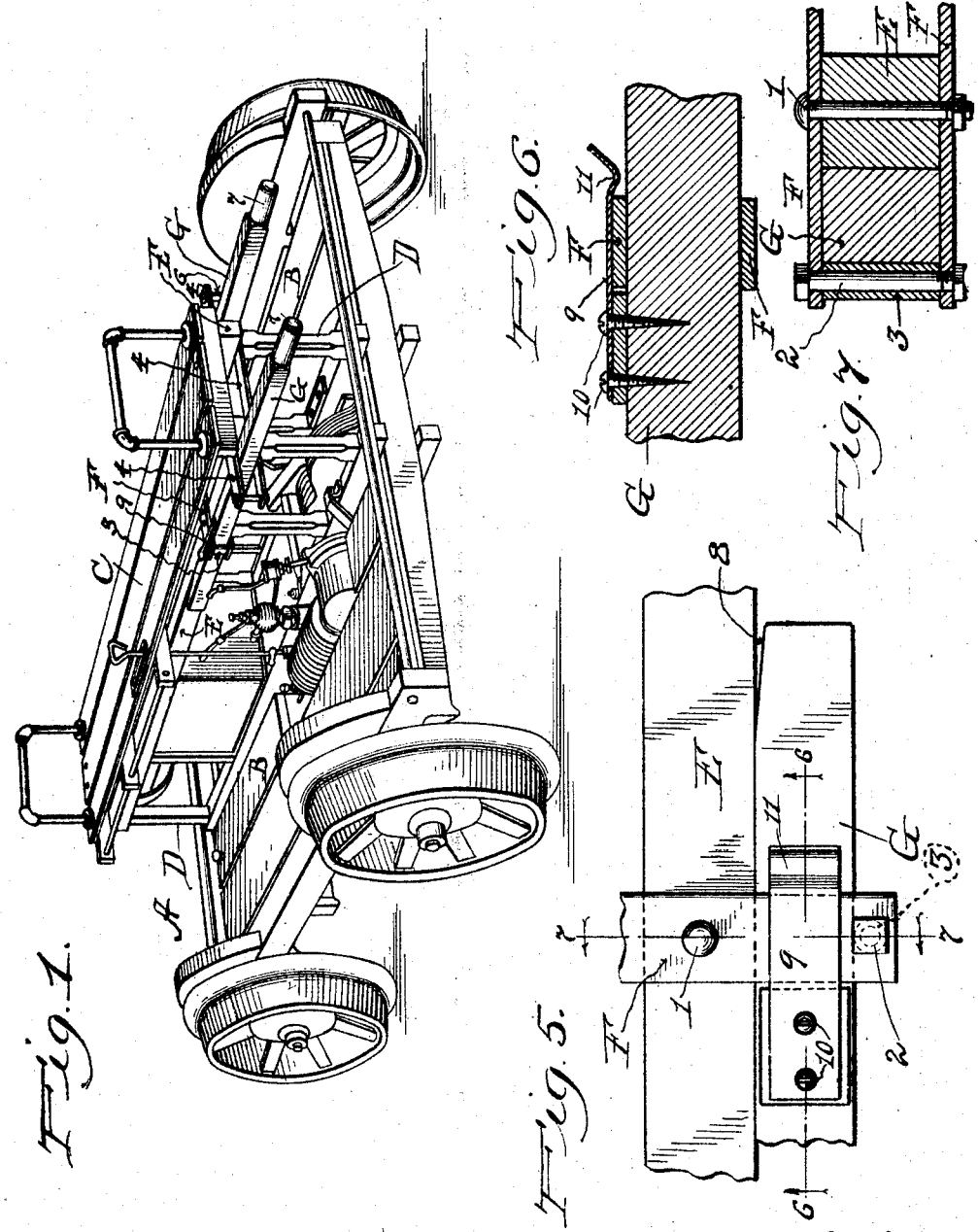
Fig. 1 is a perspective view of a car of the class referred to, in which the present invention is incorporated.

In the drawings, A represents the car as a whole, having a platform B, a raised seat C, supported centrally of the platform by a raised frame designated generally by the letter D; said frame including parallel, longitudinally disposed side rails E, and cross bars or transverse members F. The car frame and seat structure, represented as a whole in Fig. 1, not being claimed herein, per se, further description of details seems unnecessary.

On the outside of each side bar E, and longitudinally movable with respect thereto, is a handle bar G. The transverse bars or clip members F, one above and one below, the side bar E, may be secured thereto in any suitable manner, but preferably by the long bolts 1. Said members extend outwardly beyond the side margins of the side bars E above and below the handle bar member G, and are held together at their outer ends by means of the bolts 2.

Surrounding each bolt 2 is an antifriction roller member or rotatable sleeve 3. It will be seen more particularly by reference to Fig. 7, that the handle member G has sliding contact with the inner, flat surface of the members F and with the outer flat surface of the side bar E, while it has a line contact only with the rolling member 3.

At one end of the car, preferably the engine end of the car, I locate a pair of transverse bars 4, 4, which are secured to the end of the side bars E by rivets or bolts 5 and which extend laterally beyond said side bars E and to some appreciable extent beyond the outer side margins of the handle bars G. These members 4 are secured together at their outer ends by bolts 6 and are preferably provided with a rolling contact member arranged about the bolt 6 in the same manner as the member 3 is placed about the bolt 2 (Fig. 7).

The space between the extended ends of these said members 4, 4, affords a sliding support for the handle bars G. The handle bars G, as shown, are provided at their outer end with grip members or handles proper, 7, and at their inner ends, the surface adjacent to the side frame members E, is chamfered or cut away, as clearly shown at 8.

Figure 2:
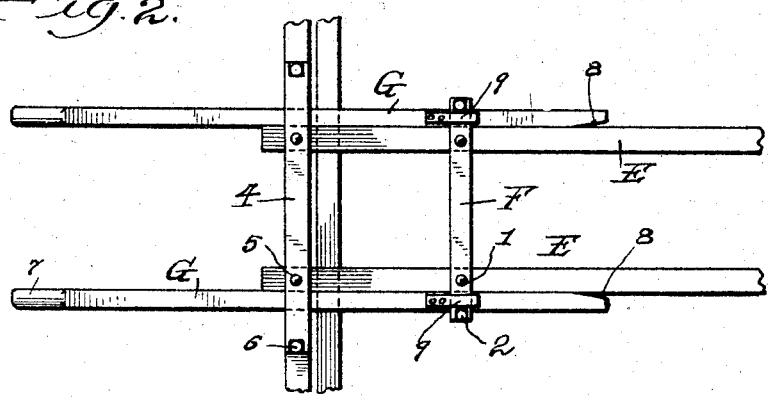
Fig. 2 is a plan view of a portion of the frame work, detached from the car proper, with the handle bars shown in their normal position.

The members G being in the normal position shown in Fig. 2, to lift the car upon or from the track, the operator will take hold of the grips 7 and pull on the two members G. This will cause these members to slide longitudinally from the position shown in Fig. 2 to the extended position shown in Fig. 3, and then to more conveniently and effectively exert lifting power, the operator will first move the members G laterally, so as to spread them apart into the position shown in Fig. 4. In this position, it will be observed that the straight, chamfered ends 8 will fit and lie close to the outer side margins of the side bars E, and the arms G will readily be moved into the spread apart position by reason of the space between the members 4, 4, above referred to. In this spread apart position, the operator can step toward the car and stand conveniently between the handle members, and lift a heavier weight, or lift the weight with greater facility and ease than heretofore.

Figure 3:
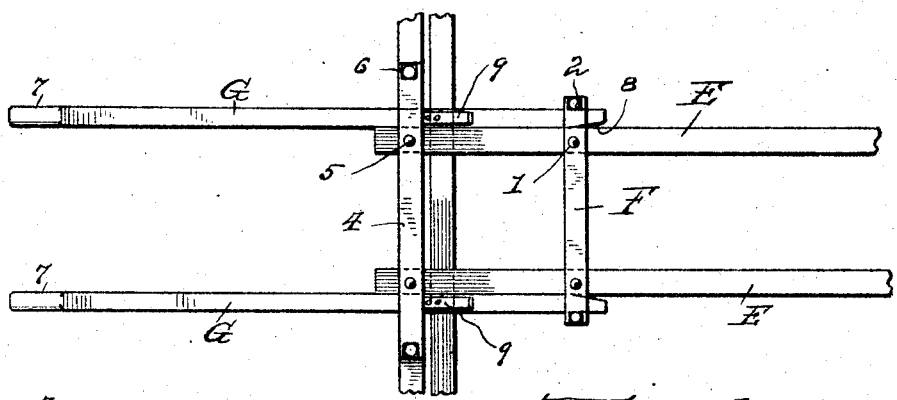
Fig. 3 is a similar view, showing the handles extended longitudinally of the frame work.
Figure 4:
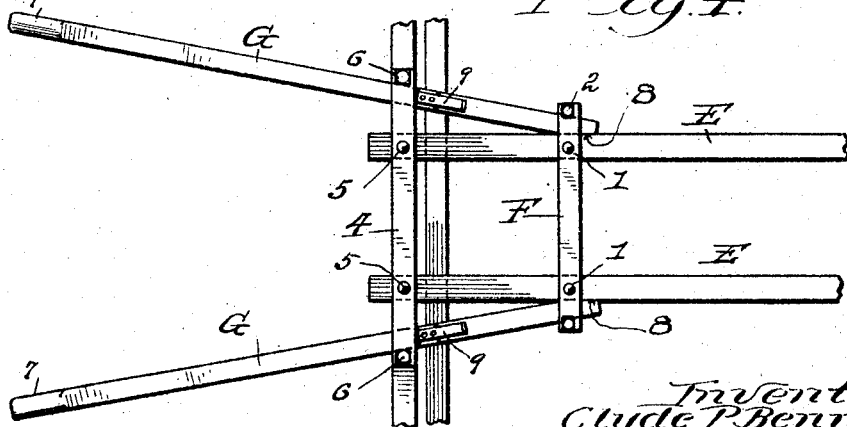
Fig. 4 is a similar view, showing the handles spread apart.

Of course, to return the handle bars to normal position, the operator brings the bars G, G, from the position shown in Fig. 4, to that shown in Fig. 3, and then pushes them toward the car to the position shown in Fig. 2.

To hold these bars in normal position and prevent their accidental moving into the extended position, I use a simple spring retaining device, more fully illustrated in Figs. 5 and 6. This consists of a flat spring member 9, secured in a raised position, equal to the thickness of the transverse member F, to the handle member G, by means of screws 10 or other convenient means. The spring member 9 will extend sufficiently to permit of its bent free end 11 passing over the member F and slightly beyond the side margin thereof. The curved or bent portion 11 of the spring member 9, it will be readily understood, will in the longitudinal movement of the bar G, contact with the edge of the member F, ride above it along the top surface thereof and by reason of the resiliency of the spring 9, immediately slide over the edge, thus locking the member G to the member F as shown in Figs. 5 and 6. The rigidity with which these parts are held together will depend upon the stiffness of the spring 9. Normally, the spring will readily bend sufficiently to cause the bent over end 11 thereof to ride over the member F whenever the operator exerts pulling force upon the handle bar G.

The ability to spread apart the handle members G, as shown in Fig. 4, is of great practical utility and makes it entirely possible for one person to manipulate with comparative ease, motor cars of the class referred to.

It is to be understood that the foregoing description relates to the particular style of car illustrated, having a raised seat frame, but that my invention is not to be limited to that particular form except as hereinafter specifically set forth in certain of the subjoined claims. The invention will be embodied in modifications which will readily be suggested to the car builder whenever and however the extension handle bars be mounted, so as to be capable of being spread apart when in the operative or extended position, which is the generic conception of the invention.

For example, except as to the type of car frame shown, it will be obvious without specific illustration, that the handle bar ends will not have to be cut away as illustrated at 8 to form stops if said bars be located otherwise than at the sides of the side bars. Such and other obvious changes I desire to have comprehended within the scope of my invention.

I claim as my invention:

1. In a motor car of the class described, a raised seat frame including longitudinally arranged side bars and a plurality of cross bars, a handle bar member movably positioned at the side of each side bar capable of longitudinal movement relative thereto and, when extended, of lateral movement also.

2. In a motor car of the class described, a raised seat frame including longitudinally arranged side bars and a plurality of cross bars, a handle bar member movably positioned at the side of each side bar capable of longitudinal movement relative thereto and, when extended, of lateral movement also, and means for limiting the spread apart lateral movement of the handle bar members.

3. In a motor car of the class described, a raised seat frame including longitudinally arranged side bars and a plurality of cross bars, a handle bar member movably positioned at the side of each side bar capable of longitudinal movement relative thereto and, when extended, of lateral movement also, the ends of the handle bar members being cut away at their inner side for contact of the inner cut face with the adjacent surface of the side bars to limit the outward lateral movement of said members.

4. In a motor car of the class described, a raised seat frame including longitudinally arranged side bars and a plurality of cross bars, a handle bar member movably positioned at the side of each side bar capable of longitudinal movement relative thereto and, when extended, of lateral movement also, the cross bars extending beyond the side bars to embrace the handle bars.

5. In a motor car of the class described, a raised seat frame including longitudinally arranged side bars and a plurality of cross bars, a handle bar member movably positioned at the side of each side bar capable of longitudinal movement relative thereto and, when extended, of lateral movement also, the cross bars extending beyond the side bars to embrace the handle bars, and provided with an antifriction intermediate member in contact with the handle bar.

6. In a motor car of the class described, a raised seat frame including longitudinally arranged side bars and a plurality of cross bars, a handle bar member movably positioned at the side of each side bar capable of longitudinal movement relative thereto and, when extended, of lateral movement also, and means for frictionally holding the handle bar in position.

7. In a motor car of the class described, a raised seat frame including longitudinally arranged side bars and a plurality of cross bars, a handle bar member movably positioned at the side of each side bar capable of longitudinal movement relative thereto and, when extended, of lateral movement also, and means for frictionally holding the handle bar in position, said means including a spring on the handle bar adapted for contact with a cross bar.

8. In a railway motor car, a pair of lifting handle bars movably mounted thereon, adapted to be extended longitudinally of the car and when so extended, to be spread apart laterally at their handle or grip ends.

9. In a railway motor car, a pair of handle bars normally in retracted and parallel relation, and adapted for extension longitudinally of the car beyond one end, and means whereby the extended ends of the handle bars may be spread apart laterally.

10. In a railway motor car, a pair of handle bars normally in retracted and parallel relation, and adapted for extension longitudinally of the car beyond one end, means whereby the extended ends of the handle bars may be spread apart laterally, and means on the handle bars cooperating with a fixed part of the car for frictionally holding the handle bars in position.

In testimony, that I claim the foregoing as my invention I affix my signature this 20th day of February, 1925.

CLYDE P. BENNING.